US009652738B2

(12) United States Patent
Bentley et al.

(10) Patent No.: US 9,652,738 B2
(45) Date of Patent: May 16, 2017

(54) SYSTEM AND METHOD FOR A COMMUNICATION SESSION IDENTIFIER

(75) Inventors: Jon L. Bentley, New Providence, NJ (US); Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 399 days.

(21) Appl. No.: 13/232,654

(22) Filed: Sep. 14, 2011

(65) Prior Publication Data
US 2013/0066978 A1 Mar. 14, 2013

(51) Int. Cl.
| G06F 15/16 | (2006.01) |
| G06Q 10/10 | (2012.01) |
| H04L 12/58 | (2006.01) |
| H04L 12/18 | (2006.01) |
| H04L 29/06 | (2006.01) |
| G06Q 50/00 | (2012.01) |
| H04M 3/56 | (2006.01) |
| H04N 7/15 | (2006.01) |

(52) U.S. Cl.
CPC ........... *G06Q 10/10* (2013.01); *G06Q 10/107* (2013.01); *G06Q 50/01* (2013.01); *H04L 12/1822* (2013.01); *H04L 12/1827* (2013.01); *H04L 12/585* (2013.01); *H04L 51/28* (2013.01); *H04L 65/403* (2013.01); *H04M 3/567* (2013.01); *H04N 7/15* (2013.01)

(58) Field of Classification Search
CPC .......................... G06Q 10/107; H04L 12/585
USPC ............... 709/206–208; 379/202.01
See application file for complete search history.

(56) References Cited

U.S. PATENT DOCUMENTS

| 7,216,143 | B2 | 5/2007 | Creamer et al. |
| 7,881,447 | B1 | 2/2011 | Satapathy et al. |
| 2004/0037406 | A1* | 2/2004 | Gourraud ................. 379/202.01 |
| 2004/0059785 | A1* | 3/2004 | Blume ................. G06Q 10/109 709/206 |
| 2007/0005691 | A1* | 1/2007 | Pushparaj ............... H04M 3/56 709/204 |
| 2008/0249796 | A1* | 10/2008 | Croy .................... H04M 3/4935 705/1.1 |
| 2008/0279118 | A1* | 11/2008 | Hyun et al. ................... 370/260 |
| 2009/0060157 | A1* | 3/2009 | Kim et al. ............... 379/202.01 |
| 2009/0094674 | A1* | 4/2009 | Schwartz et al. ................. 726/1 |

(Continued)

Primary Examiner — Backhean Tiv
Assistant Examiner — Weiwei Stiltner
(74) Attorney, Agent, or Firm — Sheridan Ross P.C.

(57) ABSTRACT

Disclosed herein are systems, methods, and non-transitory computer-readable storage media for a communication session identifier. A communication session identifier can act as a virtual relay between conference participants, forwarding emails, phone calls, attachments, messages, and other information from a central address associated with the communications session identifier. In this manner, a user who desires to communicate with other conference participants only needs to send the communication to the communication session identifier, which in turn distributes the communication to the other parties. These communications can include emails, social networking messages, instant messaging, voice messages, and other forms of communication.

16 Claims, 5 Drawing Sheets

(56) References Cited

U.S. PATENT DOCUMENTS

| | | | |
|---|---|---|---|
| 2009/0192845 A1* | 7/2009 | Gudipaty | G06Q 10/1095 705/7.19 |
| 2010/0115045 A1* | 5/2010 | Lin | 709/206 |
| 2010/0191799 A1* | 7/2010 | Fiedorowicz | G06F 17/30873 709/203 |
| 2010/0223341 A1* | 9/2010 | Manolescu | G06F 17/30905 709/206 |
| 2011/0014929 A1* | 1/2011 | Moshfeghi | H04W 4/02 455/456.3 |
| 2011/0069643 A1* | 3/2011 | Yoakum et al. | 370/261 |
| 2011/0141951 A1* | 6/2011 | Ramachandran et al. | 370/263 |
| 2011/0264745 A1* | 10/2011 | Ferlitsch | H04L 12/1827 709/205 |
| 2012/0069983 A1* | 3/2012 | Sall | 379/202.01 |
| 2012/0150863 A1* | 6/2012 | Fish | G06Q 10/101 707/741 |
| 2012/0198067 A1* | 8/2012 | Weiss | G06Q 10/00 709/226 |
| 2012/0324589 A1* | 12/2012 | Nukala | H04L 67/1097 726/28 |
| 2014/0033073 A1* | 1/2014 | Pegg | 715/753 |

* cited by examiner

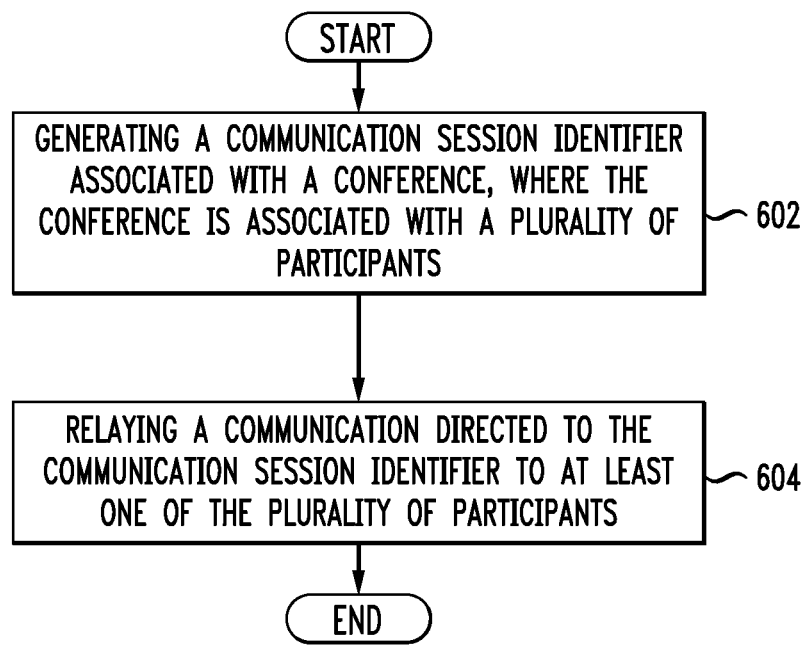

SYSTEM AND METHOD FOR A COMMUNICATION SESSION IDENTIFIER

BACKGROUND

1. Technical Field

The present disclosure relates to a communication session identifier and more specifically to a system and method for an intermediary communication system having a unique identification which can forward, transfer, and otherwise communicate information to communication session members.

2. Introduction

When invited to a telecommunications conference, such as a conference call or web conference, communicating with the other participants can be difficult. While the conference invitation usually specifies the primary communication medium for the conference (telephone, webcam, etc.), the participants are responsible for determining how alternative communications prior to, during, and after the conference are sent and distributed to fellow participants. This can often lead to frustrating scenarios where not all of the participants receive important information, or where time is lost due to insufficient communication. Further, a participant may not have contact information for other participants.

For example, if a user has received an invitation to participate in a web conference and prior to that web conference wishes to send an attachment to the other participants, the user has a variety of options. The user can attempt to log into the conference early and send the attachment through the web conference program. However this can be impeded if other participants have not logged into the web conference. Alternatively, the user can attempt to retrieve the email addresses or instant message identifiers of all attendees. This, however, is likely to result in a missed participant or duplication of participants, requires access to a list of the participants, and opens the door to 'Reply All' responses which draw ire from fellow participants.

By way of another example, if a conference call has already begun and a user wishes to communicate to the other participants that they are going to be 10 minutes late, that user has the options of calling into the conference bridge to tell the other participants that they will be another 10 minutes or of emailing all other participants with the hope that they check their email accounts. Currently available solutions inadequately solve the problem of communicating with fellow participants in a simple, efficient, and timely manner.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a communication session identifier system. A communication session identifier system can act as a virtual relay between conference participants, forwarding emails, phone calls, attachments, messages, and other information from a central address associated with a communications session identifier. In this manner, a user who desires to communicate with other conference participants only needs to send the communication to the communication session identifier, which in turn distributes the communication to the other parties. For example, if a user wishes to send an email to the other participants, the user would send the email to a communication session identifier system configured to receive and distribute emails. The communication session identifier system would then relay the communication to the other participants. Similar systems can be configured for social networking, instant messaging, voice communications, and other forms of communication. Additionally, while certain embodiments can relay communications of a single communication medium, other embodiment configurations can relay multiple forms of communication across multiple communication mediums.

In one exemplary method embodiment, the communication session identifier is associated with a conference which in turn is associated with a set of participants. The communication session identifier system then relays any communications received to at least one of the set of participants. In certain embodiments, this relay occurs automatically, whereas in other embodiments a managing participant must approve a communication prior to relaying the communication to the other participants.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communications relaying between conference participants. A system, method and non-transitory computer-readable media are disclosed which provide for a communication session identifier associated with a conference. The conference is associated with a set of participants, and communications received by the communication session identifier are directed to at least one of the conference participants. A brief introductory description of a basic general purpose system or computing device in FIG. 1 which can be employed to practice the concepts is disclosed herein. A more detailed description of various communication session identifier embodiments will then follow. These variations shall be discussed herein as the various embodiments are set forth. The disclosure now turns to FIG. 1.

Figure 1:
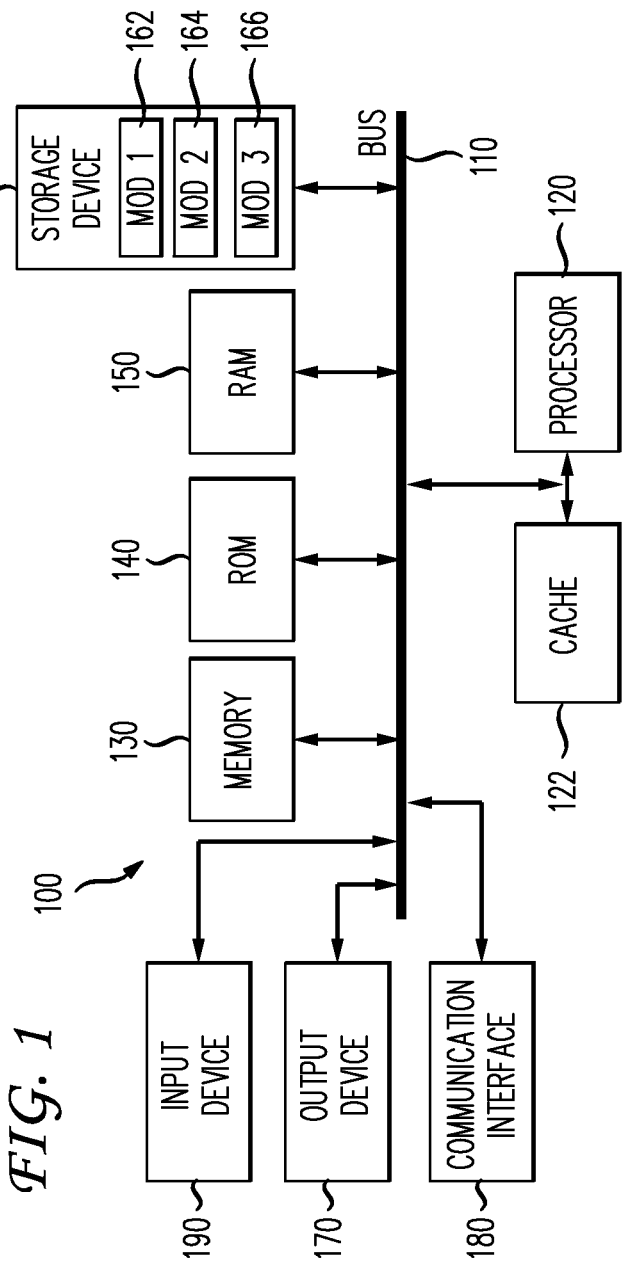
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to a discussion of a computing system configured as a communication session identifier associated with a conference. The conference permits interaction between a set of participants over a medium, and the communication session identifier can direct communications received, in that same medium or other mediums, to the set of participants. Examples of a conference can include conference calls, teleconferences, video conferences, web conferencing, or augmenting conferencing. In any of these and other forms of conferences a set of participants seek an exchange of information among the participants, at least two of which are remote from one another and linked by a communications system. For most embodiments participants are human. Nevertheless, in certain embodiments the participants can be other computing devices engaged in a conference to exchange information. One example of this includes two computers scheduled to have a conference to swap data on a specific date. In such an embodiment, the participants are the computers, and a communication session identifier can relay, store, and otherwise direct communications between the two computers.

In one embodiment, the communication session identifier is associated with email communications and an email address. A phone conference with many participants is about to begin, and one participant desires to email all the other participants an agenda. This participant emails the agenda to the communication session identifier system, which in turn distributes the agenda to the remaining participants. To send an email to the communication session identifier system requires that a communication session identifier have an email address associated with it, or alternatively, that a unique network address or other data address be associated with the communication session identifier. In this example, the communication session identifier can also have access to a database to store the email and agenda prior to and during communication. Should the communication session identifier system be unable to send or deliver the email to any of the participants, the communication session identifier system can continue to attempt to communicate the email to the remaining participants, storing the email in the database until required.

Upon initiating a phone conference users can communicate with other conference participants while the conference is ongoing. For example, a user participating in the conference who desires to distribute a file to the other conference participants can simplify the distribution process by emailing the file to the communication session identifier system which in turn directs the email and file to the remaining participants. While in most embodiments the communication session identifier system notes which participant sent the file and distributes the file to the remaining participants, the communication session identifier system can send all participants, including the user, the file. Alternatively, the system can send the file to a specified or implied subset of participants. Participants can verify distribution for record keeping purposes.

After the phone conference, users can distribute summaries, notes, or assignments via emails to the conference session identifier. A communication session identifier can persist, receive, and distribute information beyond the termination of the phone conference, as defined by an administrator or other entity, or as defined by a computer device based on collected data. This time period can be fixed, such as two days or three weeks, flexible based on a goal or assignment or frequency of use, or can be defined from contexts of the conference. For example, if a participant has received an assignment to distribute a document within a specific time period after the conference, the communication session identifier can identify that specific time period and set a termination date hours, days, or weeks after that time period.

The communication session identifier can be associated with speech communications and a voicemail box. In a similar fashion to the email embodiment, a communication session identifier system with a communication session identifier configured to receive voice messages then distributes the voice messages to phone conference participants. The communication session identifier also has access to a database wherein the voicemail can be stored and later retrieved. The manner of redistribution from the communication session identifier system to the participants can vary depending on the current situation, administrative settings, and user preference. As an example, if a phone conference has not yet begun and a user leaves a voicemail, the system can distribute the voicemail to each individual participant's voicemail prior to conference initialization. The system can store the voicemail in the database until the conference begins, then play the voicemail across a conference bridge to the participants. In order for the voicemail to be distributed across the conference bridge, the system can maintain an association or other connection between the conference bridge and the conference identifier.

The system can receive and distribute additional communications formats, such as Instant Messages (IM), text messages, social networking messages, and recorded video. Each communication format can be stored in a single database, or each communication format can be stored in databases specific to that format. The system receives communications addressed to the communication session identifier and subsequently relays the communications to conference participants. Where the computing device is configured to receive and distribute communications to a web conference, the communication session identifier can further identify the capabilities of the conference. The system can provide the participant wishing to distribute the communication with a choice based on the detected capabilities, whereas the system can provide an administrator with the choice, or the computing device can make such determinations without human interaction. For example, if the conference is a web conference, and the communication being shared is a spreadsheet document, the document could be shared such that each participant's view of the other participants is replaced by the spreadsheet, or the document could be shared such that each participant opens the document in a separate view.

Certain embodiments can have a hierarchy, where an administrator or ranked participant makes decisions as to communication distributions. These decisions can likewise determine if the communication is stored in the database, how the communication is viewed, and to whom the communication is distributed. For example, the administrator can determine that only certain participants should receive a particular attachment, and instructs the communication session identifier to distribute the attachment accordingly. The administrator can also review communications prior to approving communication distribution, instruct the communication session identifier as to when communication distribution is allowed or disallowed, as well as when certain types of communications can be distributed. In some embodiments, security and authentication can be enforced. For example, the sender may need to be authenticated either using their user ID or password, or an authentication token specific to the session and perhaps the user. The messages may also be encrypted either using pre-shared keys or by exploiting public key infrastructure (PKI).

In yet other embodiments, the communication session identifier can modify the delivery of the communication based on the current context of the conference. For example, if the conference has already begun and a user running late sends a text message reading "I will be 10 minutes late" to the communication session identifier, the communication session identifier system can forward the communication to other participants who have not yet joined the conference via IM or text distribution. To those participants already in the conference, the communication session identifier system can likewise communicate the message via IM or text, or alternatively, can convert the message to speech and broadcast the converted message across the conference bridge. The participants already in the conference would then hear a message such as "Ding! Mr. Smith sends the following: I will be 10 minutes late."

Figure 2:
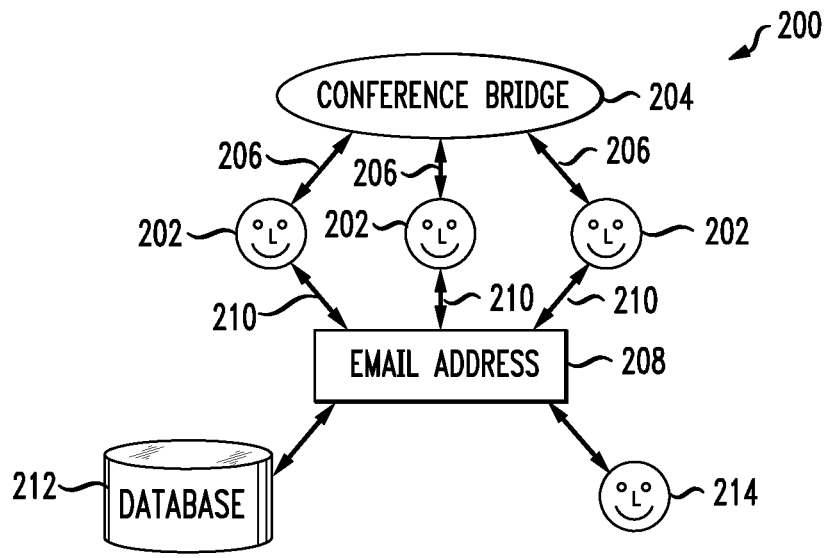
FIG. 2 illustrates an exemplary communication session identifier system using an email address communication session identifier.

Having disclosed some components of a computing system, the disclosure now turns to FIG. 2, which illustrates an exemplary communication session identifier system 200 using a communication session identifier 208 configured with an email address. In this example a number of participants 202 have already joined a conference using a conference bridge 204. Each of these joined participants 202 has a channel of communication 206 between themselves 202 and the conference bridge 204, allowing the conference to occur. The communication session identifier 208 similarly has access to a channel of communication 210 with the participants 202. Each of these current participants 202 can send an email or other communication item to the email address associated with the communication session identifier 208. The communication session identifier 208 in turn can store the email in a database 212 and forward the communication item to the other participants 202. In certain embodiments the communication session identifier system 200 delivers communications to missing participants 214 who have not yet joined the conference, while in other embodiments the communication session identifier 208 will continue checking to see if the missing participant 214 has joined the conference, at which time the communication will be retrieved from the database 212 and forwarded.

FIG. 2 further illustrates that a missing participant 214 can communicate a message or communication to the communication session identifier 208, which the communication session identifier system 200 in turn distributes the message to the current conference 200 participants 202. Because the illustrated communication session identifier 208 is configured for only an email address, no access to the conference bridge 204 is provided, only access to active participants 202 and missing participants 214.

Figure 3:
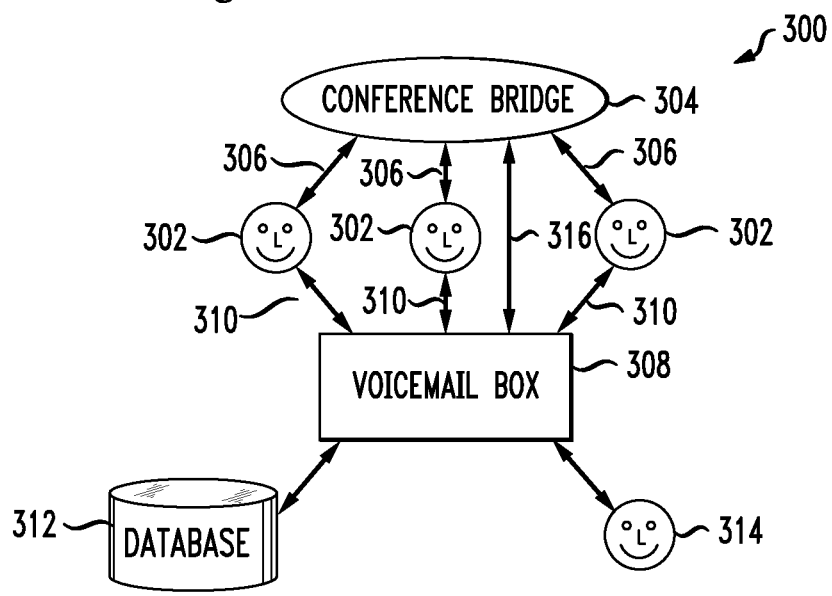
FIG. 3 illustrates an exemplary communication session identifier system using a voicemail box communication session identifier.

FIG. 3 illustrates an exemplary communication session identifier system 300 with a communication session identifier 308 configured with a voicemail box. As in FIG. 2, a number of participants 302 have already joined the conference, while other participants 314 are missing. Those participants 302 that have already joined have a channel of communication 306 to the conference bridge 304, as well as a channel of communication 310 to the communication session identifier 308. However, in addition to these channels of communication 306, 310, a channel of communication 316 exists between the conference bridge 304 and the communication session identifier 308. Because the communication session identifier 308 is configured for voicemails, when a voice communication is received the system 300 can forward it directly to the conference bridge 304 via this additional channel of communication 316. The active participants 302 will then be able to hear the voicemail over the conference bridge.

For example, if the missing participant 314 sends the communication session identifier 308 a voicemail once the conference has already begun, that voicemail can be forwarded to the conference bridge 304 and played for all of the current participants 302 at a single time. Alternatively, if the missing participant 314 sent the communication session identifier 308 a voicemail prior to the conference starting, the communication session identifier system 300 can store that voicemail in the database 312 until the conference begins. Similarly, if a current participant 302 wished to play an audio file across the conference bridge 304, and certain participants have not yet joined the conference, the communication session identifier 308 can receive the audio through the additional channel 316 and forward it directly to the missing participant 314. If desired, the communication session identifier system 300 can store the audio in the database 312 until a future time when the missing participant 314 requests it, or until an administrator determines that the audio should be distributed to active participants 302 and/or missing participants 314.

Figure 4:
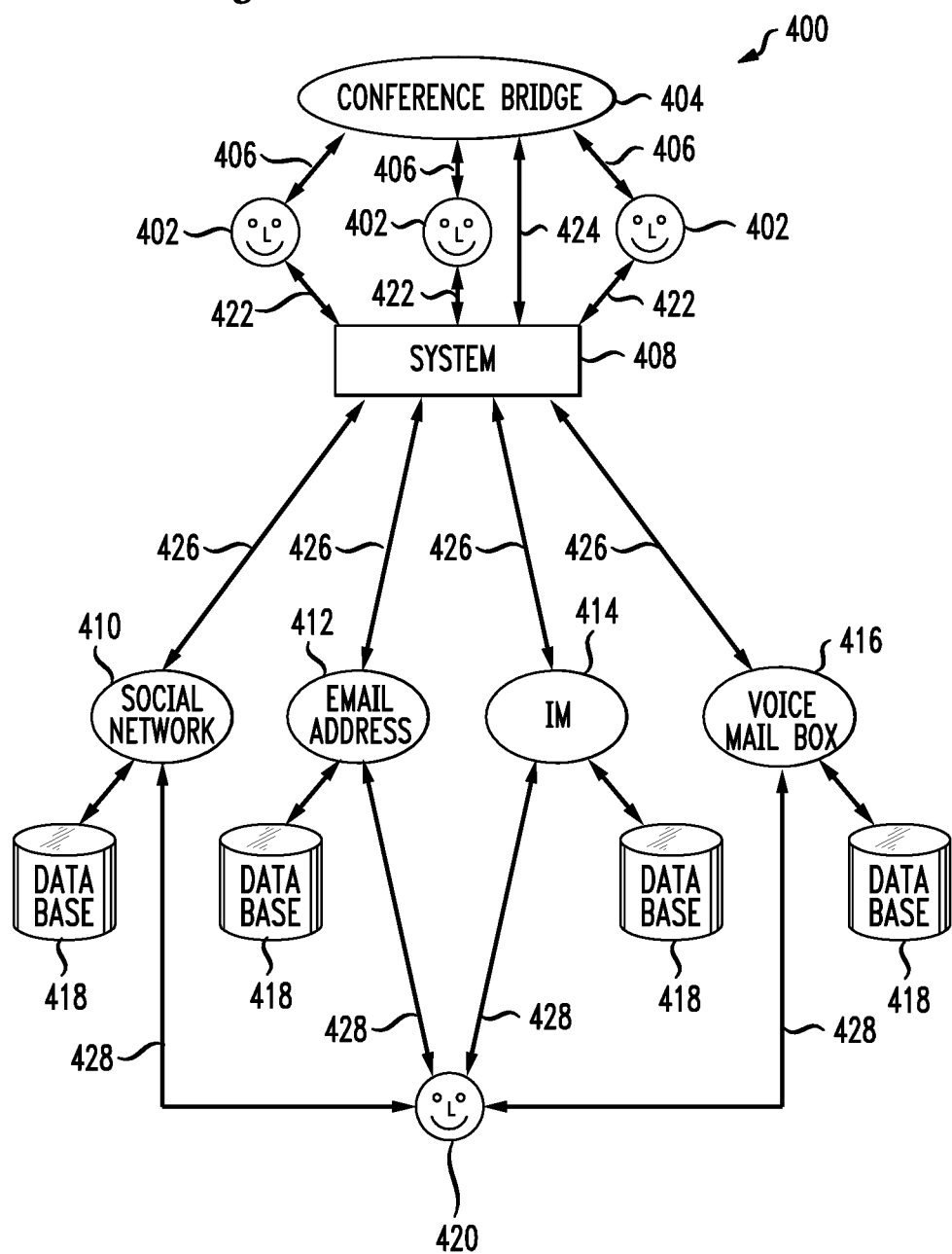
FIG. 4 illustrates an exemplary communication session identifier system using a communication session identifier configured for multiple communication mediums.

FIG. 4 illustrates an exemplary communication session identifier system 400 using a communication session identifier 408 configured for multiple communication mediums. As in FIG. 2 and FIG. 3, a number of participants 402 have already joined the conference 400 and have channels 406 of communication to the conference bridge 404. This conference bridge 404 can be a telephone conference bridge, web-enabled voice bridge, video conference bridge, or other forms of conference bridges allowing a free-flowing communication between at least two remote participants. In this illustration, a communication channel 424 further exists between the communication session identifier 408 and the conference bridge 404, allowing the communication session identifier system 400 to forward information directly to the conference bridge 404 as well as receive information directly from the conference bridge 404. The communication session identifier 408 also has channels of communication 422 with the already joined conference participants 402, as well as data paths 426 for various communication mediums 410, 412, 414, 416.

Unlike the communication session identifiers 208, 308 previously disclosed, the communication session identifier 408 of FIG. 4 is configured for multiple communication formats such as social networking 410, email 412, instant messaging 414, and voicemail 416. Each of these formats can have a separate database 418 to store communications, though some embodiments will have a single database for all communication formats. The communication session identifier system 400 can reach communicate with missing participants 420 through any of these means 410, 412, 414, 416. For example, if the missing participant 420 was running late for the conference 400 and used a social network such as Twitter®, they could tweet "Running late." The communication session identifier 408 could receive this through a social networking connection 410 and the communication session identifier system 400 could then forward this message to the active participants 402 using direct channels 422. In certain embodiments, the communication session identifier system 400 could reformat the tweet into an audio speech format and forward the message to the active participants 402 using the direct communication channel 424 between the conference bridge 404 and the communication session identifier 408.

As another example, if the current participants 402 were engaging in the conference 400 and one wished to share a document with the other participants 402 as well as those participants 420 who are not yet active in the conference, the current participant 402 can communicate the document to the communication session identifier 408 via an open channel 410. The communication session identifier system 400 then distributes the document to the remaining participants 402, and stores the document in a database 418. In certain embodiments the communication session identifier system 400 will send a notice to the missing participant 420 that a document is being held in the database 418 for them, while in other embodiments a copy of the document is communicated to the missing participant 420.

Figure 5:
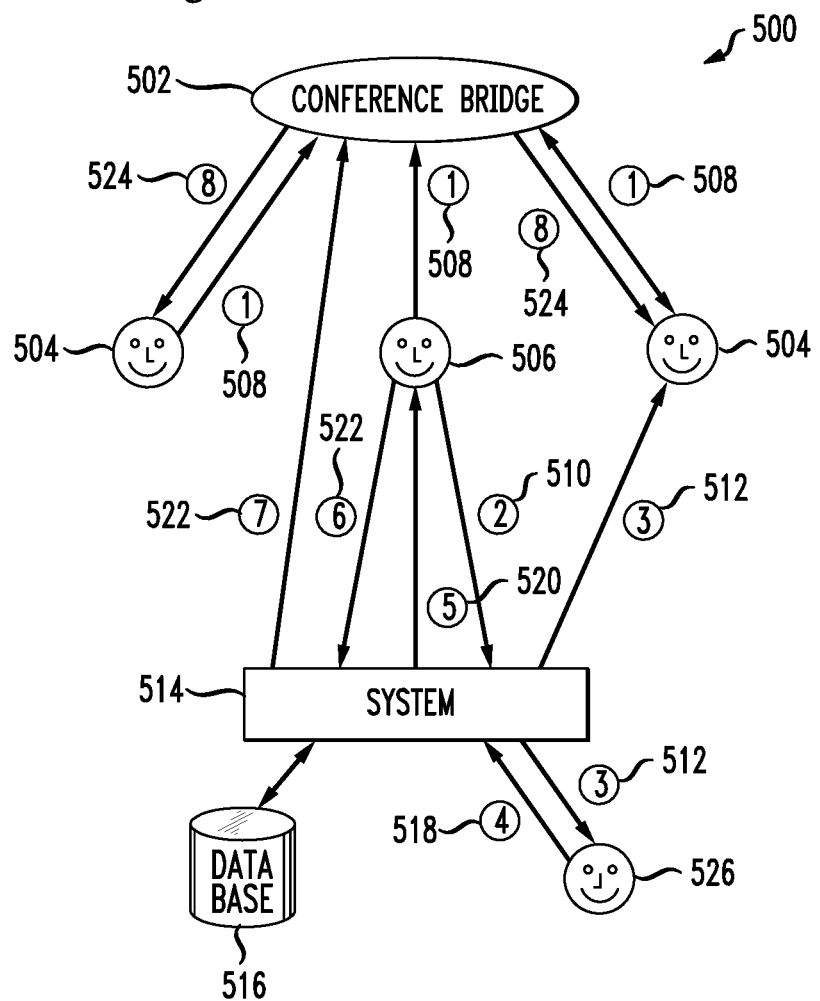
FIG. 5 illustrates an exemplary data flow of a conference using a communication session identifier.

FIG. 5 illustrates an exemplary data flow of a conference 500 using a communication session identifier 514. In this example, a number of participants 504, 506 have joined the conference 500 by communicating 508 to the conference bridge 502 that they are available. One of those active participants 506 is also an administrator, and decides to send a communication 510 to a single active participant 504 and a missing participant 526. To do so, the administrator 506 prepares a message, designates the intended recipients, and forwards it to the communication session identifier 514. The communication session identifier 514 then stores the message in a database 516 and a supporting communication session identifier system forwards the message 512 to both the active participant 504 and the missing participant 526. This message in turn prompts the missing participant to respond with a message 518, which the communication session identifier 514 stores in the database 516 and the system subsequently forwards 520 to the administrator 506. The administrator 506 reviews the message sent by the missing participant 526, and communicates 522 to the communication session identifier 514 that the missing participant's message should be broadcast over the conference bridge 502. The communication session identifier system then forwards the message 522 to the conference bridge 502, which in turn plays the message 524 for the remaining active participants 504.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

A system 100 configured in accordance with this disclosure generates a communication session identifier associated with a conference, where the conference is associated with a set of participants (602), and then relays a communication directed to the communication session identifier to at least one of the set of participants (604). In certain embodiments, this set of participants can exist as a hierarchical organization, where some participants are administrators or have seniority over the other participants. These administrators can determine who receives communications, the timing of those communications, how long the communication session identifier persists, what data is stored in the database, and communication formats. A system 100 configured according to this method can further change delivery based on current conference context. For example, if a telephone conference has already begun, the delivery can reformat a voicemail into a text message and deliver the text message to the computers of the participants. In this way the conversation of the telephone conference remains uninterrupted while all the participants receive the message contained in the voicemail. Likewise, if preferred, conference participants can configure the system 100 so that if the conference has already begun any text or email messages sent to the communication session identifier convert into speech, which is then played across the conference bridge. Formats of the communication can include, but are not limited to, phone, email, voicemail, text, and social networking.

A communication session identifier within such a system 100 can exist indefinitely, or can be generated specifically for a single conference. Additionally, the groups of participants known to communication session identifiers can be modified and can have subsets. For example, if a program manager were organizing a conference call for a project, one communication session identifier could include everyone associated with a project, while a subset of that communication session identifier could include only the engineers associated with the project. The list of participants could be automatically generated, or can be selected by the manager or another user. By being in a subset of a greater hierarchy, the program manager and the engineers can communicate rapidly in a direct fashion among themselves, and if the need exists to contact other members of the larger program they are still included in the larger communication session identifier. If, for example, a conference is associated with a number such as 3859, subsets could be identified as a part of that number, such as 3859.1 for the engineers and 3859.2 for marketing. In other contexts the subset can be identified by names, letters, numerals, or other identifying means. This can apply equally to email, telephone, SMS addresses, and other communication mediums. If the communication session identifier is particular to a single communication medium, the subsets will likewise be restricted to that single communication medium. If, however, the communication session identifier is accessible across multiple medium formats, access to the subsets can be limited to a specific medium or available across multiple mediums. A meta-identifier can be implemented to group these various identifiers together and reduce communication confusion.

While certain conferences will only have a single medium in which the communication session identifier operates, where multiple mediums exist a user can feel overwhelmed by the available communication channels. The users can set a preference for the communication mode they wish to receive, and reduce the likelihood of feeling overwhelmed. This preference can also force the system 100 to change the communication medium to fit the receiving user's preference. For example, if a missing participant sent a text message and the receiving participant has a preference for speech communications, the system 100 can convert the text to speech to fit that preference.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to conference calls and to web conferencing. Those skilled in the art will readily recognize various modifications and changes that may be made to the principles described herein without following the example embodiments and applications illustrated and described herein, and without departing from the spirit and scope of the disclosure.

We claim:

1. A method comprising:
generating a communication session address associated with a conference, the communication session address for relaying messages of a plurality of different message types to the conference;
receiving a message of a first message type of the plurality of different message types and directed to the communication session address, wherein the received message is not received as part of the conference;
determining a current context of the conference based at least in part on whether the conference has started;
modifying the received message from the first message type to a second message type of the plurality of different message types based at least in part on the determined current context of the conference, wherein the received message comprises a voicemail message type and wherein modifying the received message comprises modifying the received communication from the voicemail message type to at least one of a social networking message type, an instant message type, or an email message type when the current conference context indicates the conference has started; and
relaying, via a processor, the received message to a first attendee currently participating in the conference and the modified received message to a second attendee that is not currently participating in the conference and wherein relaying the modified received message comprises delivering the modified received message during the conference.

2. The method of claim 1, wherein the conference comprises an audio conference.

3. The method of claim 2, wherein the plurality of different message types comprises at least two of a social networking message type, an instant message type, a voicemail message type, and an electronic mail message type.

4. The method of claim 1, wherein participants of the conference are organized in a hierarchy, wherein one of the participants is an administrator.

5. The method of claim 1, further comprising generating a plurality of communication session addresses based on the communication session address, wherein each of the plurality of communication session addresses correspond to a different one of the plurality of different message types, and wherein each of the plurality of communication session addresses comprises an address for connecting to the conference.

6. The method of claim 5, wherein each communication session address of the plurality of communication session addresses is associated with a subset of participants of the conference.

7. A system comprising:
a processor; and
a memory storing instructions which, when executed by the processor, cause the processor to perform operations comprising:
generating a communication session address associated with a conference, the communication session address for relaying messages of a plurality of different message types to the conference;
receiving a message of a first message type of the plurality of different message types and directed to the communication session address, wherein the received message is not received as part of the conference;
determining a current context of the conference based at least in part on whether the conference has started;
modifying the received message from the first message type to a second message type of the plurality of different message types based at least in part on the determined current context of the conference, wherein the received message comprises a voicemail message type and wherein modifying the received message comprises modifying the received communication from the voicemail message type to at least one of a social networking message type, an instant message type, or an email message type when the current conference context indicates the conference has started; and
relaying, via a processor, the received message to a first attendee currently participating in the conference and the modified received message to a second attendee that is not currently participating in the conference and wherein relaying the modified received message comprises delivering the modified received message during the conference.

8. The system of claim 7, wherein the conference comprises an audio conference.

9. The system of claim 7, wherein the plurality of different message types comprise at least two of a voicemail message type, an electronic mail message type, a social networking message type and an instant message type.

10. The system of claim 7, wherein participants of the conference are organized in a hierarchy.

11. The system of claim 7, wherein participants of the conference is an administrator, the memory storing additional instructions which, when executed by the processor, result in an operation comprising mapping the communication session address to a first address associated with a first message type of the plurality of different message types for communicating with the conference and a second address associated with a second message type of the plurality of different message types for communicating with the conference.

12. The system of claim 7, the memory storing additional instructions which, when executed by the processor, result in operations further comprising generating a plurality of communication session addresses based on the communication session address.

13. The system of claim 12, wherein each communication session address of the plurality of communication session addresses is associated with a different message type of the plurality of different message types and a subset of participants of the conference.

14. A computer-readable storage device storing instructions which, when executed by a processor, cause the processor to perform operations comprising:

generating a communication session address associated with a conference, the communication session address for relaying messages of a plurality of different message types to the conference;

receiving a message of a first message type of the plurality of different message types and directed to the communication session address, wherein the received message is not received as part of the conference;

determining a current context of the conference based at least in part on whether the conference has started;

modifying the received message from the first message type to a second message type of the plurality of different message types based at least in part on the determined current context of the conference, wherein the received message comprises a voicemail message type and wherein modifying the received message comprises modifying the received communication from the voicemail message type to at least one of a social networking message type, an instant message type, or an email message type when the current conference context indicates the conference has started; and relaying, via a processor, the received message to a first attendee currently participating in the conference and the modified received message to a second attendee that is not currently participating in the conference and wherein relaying the modified received message comprises delivering the modified received message during the conference.

15. The computer-readable storage device of claim 14, wherein the message type of the received message is different from a message type of the conference.

16. The computer-readable storage device of claim 15, wherein the plurality of different message types comprise at least two of a speech message type, a voicemail message type, an email message type, a text message type, a social networking message type, and an instant message type.

* * * * *